June 21, 1966 A. EILING 3,256,992
DEVICE FOR SUPPORTING SIEVES AND FILTER MATERIALS
Filed June 26, 1962 3 Sheets-Sheet 1
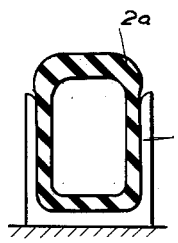
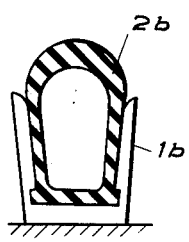
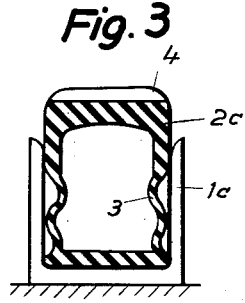
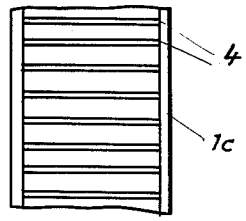
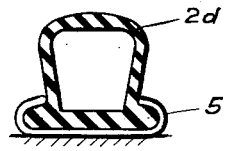
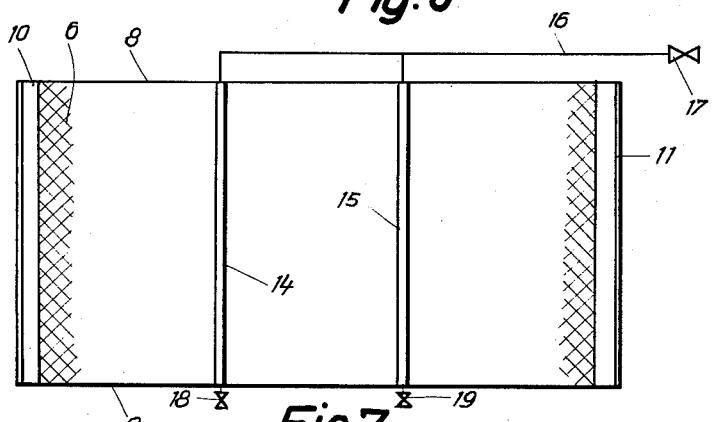
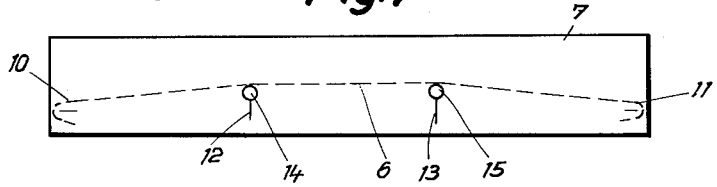
INVENTOR.
ALBERT EILING
BY Richards & Geier
ATTORNEYS June 21, 1966  A. EILING  3,256,992
DEVICE FOR SUPPORTING SIEVES AND FILTER MATERIALS
Filed June 26, 1962  3 Sheets-Sheet 2
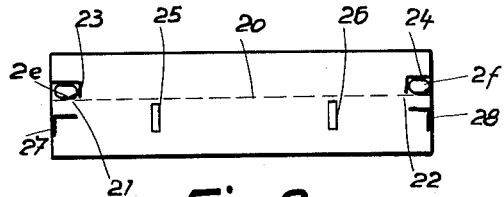
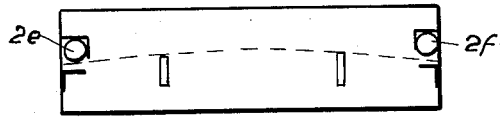
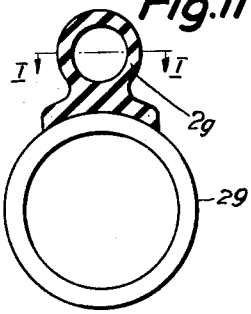
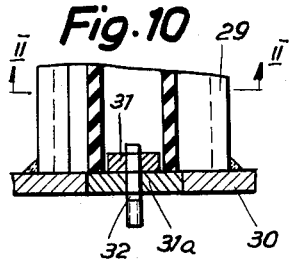
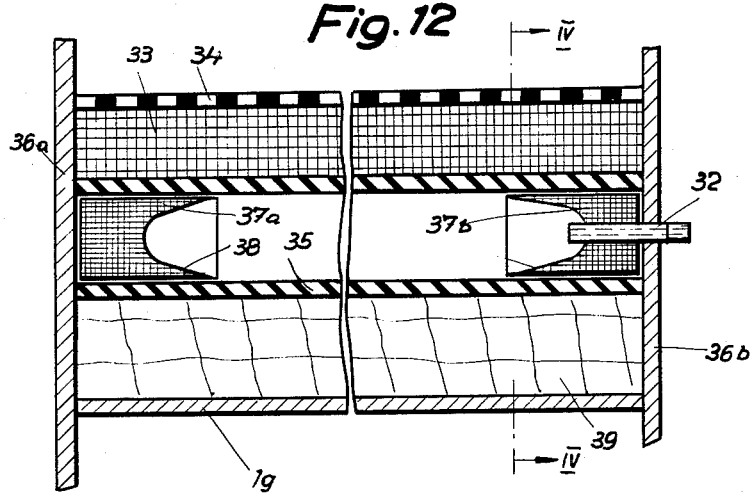
INVENTOR.
ALBERT EILING
BY Richards & Geier
ATTORNEYS June 21, 1966  A. EILING  3,256,992
DEVICE FOR SUPPORTING SIEVES AND FILTER MATERIALS
Filed June 26, 1962  3 Sheets-Sheet 3
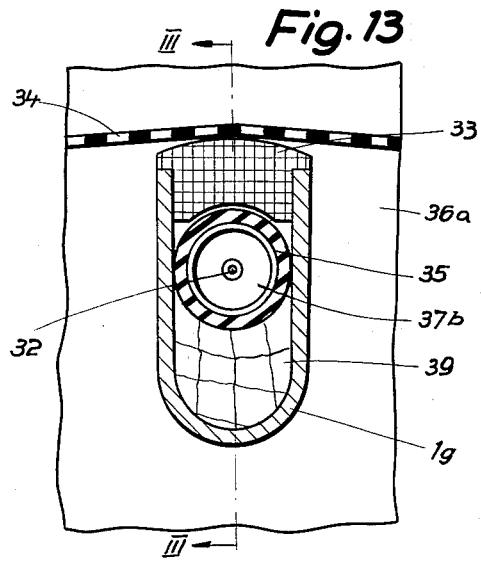
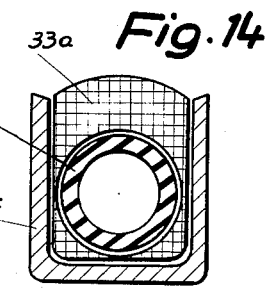 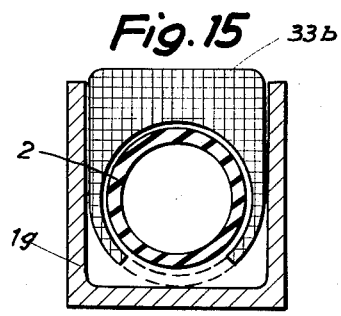
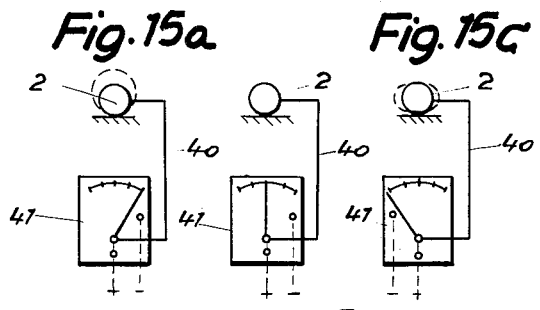
INVENTOR.
ALBERT EILING
BY Richards & Geier
ATTORNEYS United States Patent Office 3,256,992
Patented June 21, 1966

3,256,992
DEVICE FOR SUPPORTING SIEVES AND
FILTER MATERIALS
Albert Eiling, Hindenburg Allee 27,
Muenster-St. Mauritz, Germany
Filed June 26, 1962, Ser. No. 205,259
3 Claims. (Cl. 210—251)

This invention relates to sieves and filters and refers more particularly to a device for supporting in a stretched state mesh-like sheets used as sieves and filters.

It is a matter of general knowledge that up to a certain wire strength such sheets can be used only in a stretched condition. The provision of adequate means for stretching the sheets has been an old problem of the industry. Initially the sheets which had to be supported in a stretched condition, were provided with thickened portions at their edges and holes were formed in these portions. Supporting means which usually consisted of screws, were inserted into these holes. Up to the present time a larger part of filtering and sieve apparatus is provided with these most inconvenient supporting and stretching means.

It is also known that sheets used as sieves and filters will operate properly and will have the greatest possible durability only if they are stretched with a certain amount of tension which can be precisely calculated. In prior art, attempts were made to supply these tension forces, which amount to several 1,000 kg. in usual sieve operations, by hydraulic means and it was also suggested that those filled with compressed gas be used for this purpose.

It was also suggested in prior art that high tension pressures may be avoided by holding the mesh-like sheets at their ends and by pressing upwardly the transverse connections which divide the sheet area and which serve as a support for the sheet. These theoretically valuable considerations were not followed, however, by any practically suitable constructions for stretching the sheets.

An object of the present invention is to provide devices which will eliminate the drawbacks of prior art constructions.

Other objects will become apparent in the course of the following specification.

The present invention is based on the consideration that suitably formed hollow elastic bodies when subjected to pressure can exert precisely measurable forces in predetermined directions; thus the transverse connections of sieve and filter apparatus, which subdivide the sieve area into separate fields, are ideally suitable for use as tensioning means.

According to another feature of the present invention it was found advisable to provide an elastic bar between bar between the hollow tensioning member and the sheet which is to be stretched.

The invention will appear more clearly from the following detailed description when taken in connection with the accompanying drawings showing, by way of example only, preferred embodiments of the inventive idea.

In the drawings:

FIGURE 1 is a side view of a supporting and tensioning device including a U-shaped profiled member which is open on top.

FIGURE 2 illustrates a construction which is similar to that shown in FIG. 1 and which has upwardly conically spreading legs.

FIGURE 3 shows a construction in the form of bellows with elastic sides.

FIGURE 4 is a top view of the device shown in FIG. 3.

FIGURE 5 illustrates a differently constructed supporting and tensioning device.

FIGURE 6 is a top view of a sieve box having a built-in supporting and tensioning device.

FIGURE 7 is a side view of the device shown in FIG. 6.

FIGURE 8 illustrates diagrammatically and in cross-section a sieve box having so-called side tension in its untensioned condition.

FIGURE 9 shows the box of FIG. 8 in its tensioned condition.

FIGURE 10 shows an end part of a sieve box with a tubular transverse connection and with a mounted tensioning member, in section along the line I—I of FIG. 11.

FIGURE 11 is a section along the line II—II of FIG. 10.

FIGURE 12 illustrates a further embodiment of the present invention and is a section along the line III—III of FIG. 13.

FIGURE 13 is a section along the line IV—IV of FIG. 12.

FIGURE 14 is a transverse section through a supporting rail containing a hollow tensioning member and a hollow pressure-transmitting bar into which the hollow tensioning member is inserted.

FIGURE 15 is a transverse section through a supporting rail with a hollow tensioning member which is partly enclosed by a pressure transmitting bar.

FIGURE 15a is a diagram illustrating an indicating, signalling and switching-off device in a position in which it indicates excessive pressure.

FIGURE 15b is similar to FIG. 15a and shows the same device when indicating normal pressure.

FIGURE 15c is similar to FIGS. 15a and 15b and shows the same device when indicating sub-normal pressure.

FIGURE 1 shows in side view a rigid profiled member, such as a U-shaped iron bar 1a provided with an elastic hollow body 2a of nearly rectangular form.

FIGURE 2 shows in side view of similar iron bar 1b having rounded edges constituting a support for holding the elastic hollow body 2b.

FIGURES 3 and 4 show a bar 1c with a hollow body 2c. In this construction the side walls 3 have the shape of bellows, so as to provide a greater extension in the direction of tension. Cut-out recesses 4 in the supporting surface of the hollow body 2c make it possible to adapt the device conveniently to the sheet which is to be stretched FIGURE 5 illustrates a special construction, wherein the base of an elastic hollow body 2d is enclosed by a member of special illustrated profile, while the remaining portion of the body 2d can yield from all sides (for all practical purposes) to the inner pressure.

In all elastic bodies 2a, 2b and 2c, the thickness of the wall should be greater at the location wherein it is connected with the sheet to be tensioned, to take care of clogging. The pressure of the hollow body is exerted in a direction perpendicular to the surface of the sheet.

The side flanges are made weaker, as a rule, or they may even have the shape of a foldable bellows 3, to provide the required space elasticity at that location. This greater elasticity of the side flanges makes it also possible to compensate for the transverse waves in the sheet, which can not be always avoided even after careful manufacture.

It is also possible to strengthen the elastic hollow body at its support location with a harder material which has a greater resistance against clogging, in order to diminish the possibility of such clogging by the material to be sieved or filtered.

FIGURES 6 and 7 show diagrammatically a box 7 of a sieve aparatus, having sides 8 and 9. In order to support and tension the sheet 6, the side edges 10 and 11 of the sheet 6 which are used for connecting the sheet, are attached to the receiving devices. Thereupon the elastic hollow bodies 14 and 15 which are fixed upon the transverse supports 12 and 13, are subjected to pressure. This will tension the sheet 6. The tensioning pressure can be produced simply by pumping, for example, by means of a manually operated air pump, or by a source of compressed air which is connected with a central connecting conduit 16 and a valve 17.

It is also possible to provide the separate supporting locations 14 and 15 with different pressures by the use of valves 18 and 19, so as to balance possible lack of uniformity in the sieve box 7 or in the sieve sheet 6 as well.

As a rule, however, it is preferable to provide all hollow bodies with a single central pressure-supplying device for pumping purposes.

An additional advantage of the system in accordance with the present invention is the possibility of providing an easily measurable tension, whereby the pressure measuring instruments are advantageously provided upon a quiet location away from the movable parts of the apparatus, so that the correct tension-producing pressure can be easily controlled by the operators. Remote control is also possible.

FIGURES 8 and 9 illustrate a construction having a wire mesh 20 consisting of heavier wires which due to their thickness can not be tensioned any more by pull-exerting tension forces. The mesh 20 has sheet ends 21 and 22 which are pressed downwardly over counter supports 23 and 24 for the elastic hollow bodies 2e and 2f and the intermediate supporting locations 25 up to the supporting angles 27 and 28, so that the wire mesh 20 is held by bending tensions, whereby the elastic bodies 2e and 2f spread out, yielding to the inner pressure which has been provided.

FIGURES 10 and 11 show an elastic hollow body 2g of special form which is fixed to a tubular transverse support 29. FIGURE 10 illustrates, by way of example, a detail of the end locks. The tubular transverse carrier 29 is connected by soldering to the diagrammatically indicated side wall 30 and carries upon its upper side the elastic hollow body 2g, whereby the latter is firmly guided along the side wall 30 of the sieve or filter apparatus. A special threaded plug 31 is inserted into the hollow body 2g and serves as an end closure; it is connected air-tightly with the hollow body 2g. The larger portion 31a of the plug 31 extends through wall 30. The plug 31 has a bore hole into which a little tube 32 provided with a threaded connection is inserted. The device can be attached at this location to a source of pressure medium.

Practical experiences with the described subject matter of the present invention have produced the surprising results that the useful life of sieve sheets has been increased to several times the duration of sheets used in prior art devices. As a rule, the increase is three to five times the duration of sheets in prior art devices. Thus, however, produced the problem of adapting the effective duration of the hollow bodies to the new duration of the sheets, which has become several times greater than in the past.

This object of the present invention has been accomplished, as illustrated in FIGURES 12 and 13, through the provision of a bar 33 which is provided between the sieve 34 and the elastic hollow body 35. The bar 33 is made of elastic material, so that it can adapt itself to all irregularities in the shape of the sieve sheet and the sieve apparatus and compensates for them. As shown in FIGS. 12 and 13, the elastic hollow body 35 is located between the sides 36a and 36b of the sieve apparatus. One end of the hollow body is tightly closed by a rigid or elastic closure 37a of special form, while a similar closure 37b is provided at the other end and carries a tube 32 which may be connected to a valve or a source of pressure. Those ends of the closures 37a and 37b which are directed toward the interior of the hollow body, are provided with curved recesses enclosed by lips 38; these lips are particularly elastic and serve as automatically operating seals due to the action of pressure within the hollow body. As illustrated by way of example in FIG. 13, differences in height can be easily compensated by an insert 39 within the rail 1g.

The tube 32 can be provided with a valve (not shown) of the type generally used in automobile tires. This arrangement makes it possible to conveniently pump in compressed air by hand and also to retain air pressure in case there is a drop in pressure in the central pressure conduit.

FIGURE 14 shows that it is possible to combine the bar with the elastic hollow body in such manner that the two remain connected to each other. In accordance with this embodiment, the bar 33a is so constructed that it can receive in its hollow interior the hollow body 2. This construction has the further advantage that during assembly the bar is firmly connected with the supporting rail 1f.

FIGURE 15 illustrates a construction which is similar to that shown in FIG. 14, but wherein the bar encloses only partly the hollow body 33b.

As indicated by broken lines in FIG. 15, the ends of the bar can be pulled over the hollow body 33b so as to enclose it completely.

Practical experience has shown that it is advantageous for the operating personnel to be informed promptly of each deviation from the correct operational conditions. For this purpose one or more hollow bodies 2 (FIGS. 15a, 15b and 15c) are connected by a pressure conduit 40 with a pressure measuring instrument 41 provided with two contacts connected to wires indicated by the plus and minus signs in the drawings, and showing correct pressure and highest and lowest permissible pressures. When pressure exceeds or drops below the set limits, an electrical signalling device (not shown) is actuated which may be connected to another device which stops the apparatus.

FIGURE 15a shows the position of the instrument when excessive pressure prevails in the device.

FIGURE 15b shows the position of the instrument when the pressure is correct.

FIGURE 15c shows the position of the instrument when pressure is below the set limit.

Deviations of the hollow body 2 from its normal state are shown by broken lines in FIGS. 15a and 15c.

The pressure supplying means can consist of compressed air which is available in most plants, or of liquids, or of dough-like substances, or of organic or synthetic plastic masses the use of which is known in prior art.

The subject matter of the present invention was found to be most successful in actual practice. For the first time it has provided for the operational personnel a device which can be completely supervised and which will compensate automatically for all operational irregularities.

It is apparent that the examples described above have been given solely by way of illustration and not by way of limitation and that they are subject to many variations and modifications within the scope of the present invention. All such variations and modifications are to be included within the scope of the present invention.

What is claimed is:

1. In a sieving and filtering apparatus, in combination with a mesh-containing sheet, a device for tensioning said sheet, said device comprising a rigid profiled member, an elongated elastic hollow body supported by said member, an elastic bar located between said hollow body and said sheet and engaging said hollow body and said sheet, two plugs, each of said plugs having a curved recess and an annular lip adjacent said recess, the recess and the lip of each plug closing a separate end of said hollow body, and means supplying a medium under pressure into said hollow body, whereby expansion of said hollow body presses said bar against said sheet and whereby said lips serve as pressure exerting seals.

2. A device in accordance with claim 1 wherein said hollow body comprises a base, said profiled member having sides enclosing said base.

3. A device in accordance with claim 1, wherein said elastic bar has round portions at least partly enclosing said hollow body.

References Cited by the Examiner

UNITED STATES PATENTS

| | | | |
|---|---|---|---|
| 2,378,463 | 6/1945 | Burls | 209—402 |
| 2,437,131 | 3/1948 | Shaw. | |
| 2,651,204 | 9/1953 | Dickinson | 73—391 X |
| 2,681,635 | 6/1954 | Bowen | 73—396 X |
| 2,750,043 | 6/1956 | Thompson | 210—389 X |
| 2,838,937 | 6/1958 | Mansfield et al. | 73—391 |
| 2,867,324 | 1/1959 | Hirs | 210—387 X |
| 3,039,044 | 6/1962 | Dubsky et al. | 73—136 X |

REUBEN FRIEDMAN, *Primary Examiner.*

ROBERT F. BURNETT, *Examiner.*